C. HERTLE.
TOOL MAKER'S GAGE.
APPLICATION FILED MAR. 7, 1918.
1,286,313.
Patented Dec. 3, 1918.
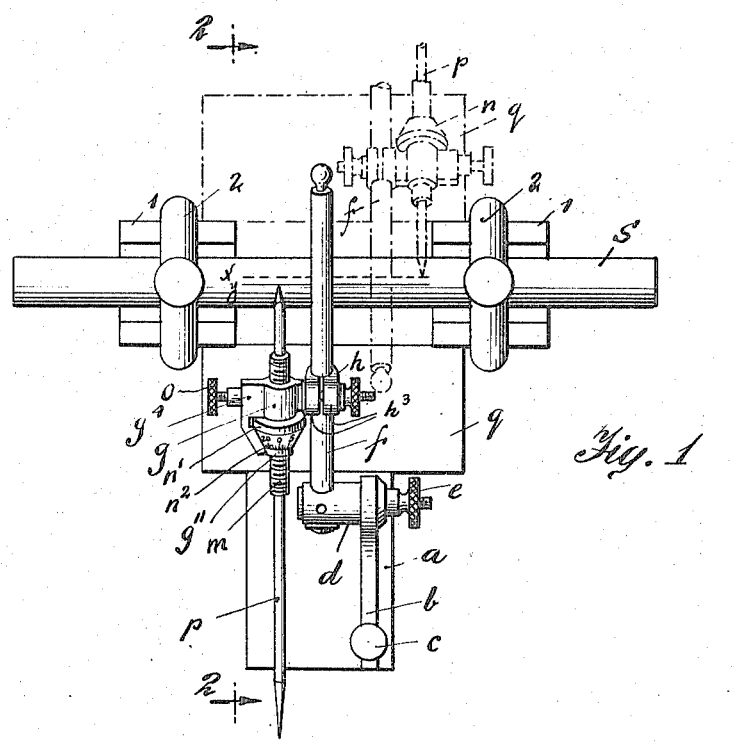
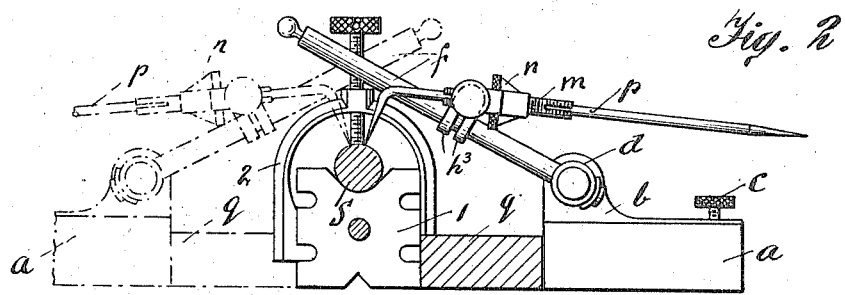
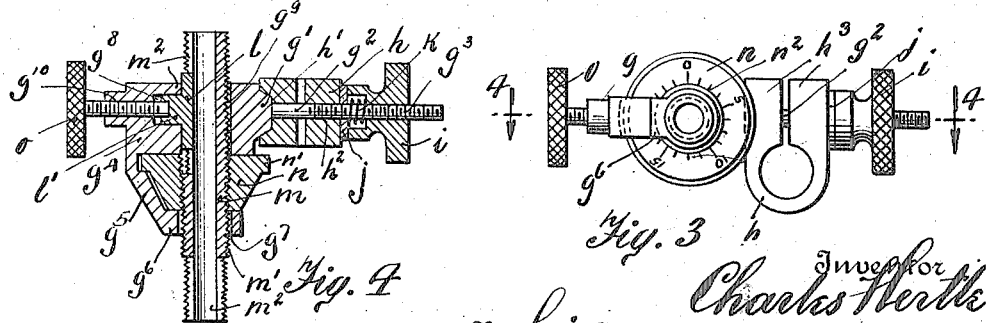

UNITED STATES PATENT OFFICE.

CHARLES HERTLE, OF ASTORIA, NEW YORK.

TOOL-MAKER'S GAGE.

1,286,313.  Specification of Letters Patent.  Patented Dec. 3, 1918.

Application filed March 7, 1918. Serial No. 220,895.

*To all whom it may concern:*

Be it known that I, CHARLES HERTLE, a subject of the Emperor of Austria-Hungary, residing at Astoria, in the county of Queens and State of New York, have invented certain new and useful Improvements in Tool-Makers' Gages, of which the following is a specification.

The present invention relates to tool makers' surface gages adapted for light work and has for its object to provide a construction which will greatly improve the hitherto used gages in permitting minute and correct gaging without difficulty.

With this object in view, my invention consists in the construction, combination and arrangement of parts as will be hereinafter more fully described and set forth in the appended claims.

The invention is illustrated in the accompanying drawing which forms part of the specification, and in which similar reference characters denote corresponding parts, Figure 1 being a top plan view of the device showing the manner in which it is used; Fig. 2 is a section on line 2—2 of Fig. 1; Fig. 3 is an enlarged end view of the micrometer device for the micrometric gaging of the scriber, and Fig. 4 is a section on line 4—4 of Fig. 3.

The device consists substantially of a base $a$ of steel or other suitable material, in the top surface of which a bracket $b$ is suitably supported. The forward end of the bracket $b$ serves as a bearing for a cylindrical arm $d$ which carries a spindle or rod $f$. The arm $d$ is capable of turning around its axis within the bearing of the bracket $b$ and to be fixed in position after its adjustment by a nut $e$. The spindle $f$ projects forwardly from the arm $d$ and serves as a support for the mechanism carrying the scriber $p$, which constitutes the tool proper to be used as a gage.

This mechanism comprises a sleeve $g$ from the circumference on one side of which projects a wedge-shaped nose $g'$ formed centrally with an extension or spindle $g^2$, which is partly screw threaded as at $g^3$. The wedge-shaped nose $g'$ is adapted to engage into a depression $h'$ of a clamp member $h$, which is adjustably mounted on the spindle $f$. The spindle $g^2$ is adapted to freely pass through the bore $h^2$ provided in the arms $h^3$ of the clamp $h$ and to carry on its threaded end $g^3$ a washer $j$, spring $k$ and nut $i$, upon whose tightening the member $h$ will be clamped in position on the spindle $f$ and the wedge $g'$ will be simultaneously drawn into the depression $h'$ and a tight joint between the sleeve $g$ and the clamp member $h$ produced. On the opposite side the sleeve $g$ has a projection $g^4$ from which extends downwardly an oblique arm $g^5$, the rear or lower end of which is bent as at $g^6$ to be parallel with the ends of the sleeve and is centrally perforated at $g^7$ to form a ring. In the sleeve $g$ is adapted to loosely bear a hollow spindle $m$, on the outer circumference of which a fine thread $m'$ is provided whereby a micrometric adjustment of the scriber $p$, as will be explained, is afforded. This hollow spindle or sleeve $m$ is slotted longitudinally at one side as at $m^2$ to engage a member $l$ whereby the scriber $p$, which is loosely borne within the hollow $m^2$ of the spindle $m$, can be clamped or fixed in position after it has been adjusted to the proper position. The member $l$ is in form of a block of metal which, on the opposite side of its working surface, is provided with a projection $l'$ slidably borne in a groove $g^8$ extending from the bore $g^9$ of the sleeve $g$. A screw $o$ working in a threaded bore $g^{10}$ of the sleeve extending centrally from the groove $g^8$ is adapted to engage the member $l$ so that by its tightening or slackening the member $l$ will be moved inwardly or released and thereby clamp or release the scriber $p$. Between the rear or lower end of the sleeve $g$ and the ring shaped bend or arm $g^6$, a beveled nut $n$ is mounted, so proportioned that it snugly fits in the space between the said parts. This nut is adapted to work on the threads $m'$ of the spindle $m$ so as to feed the latter micrometrically forwardly or rearwardly within the sleeve $g$ and through the perforation $g^7$ according to the direction of rotation of the nut. The upper end of the nut is formed with a milled flange $n'$ to facilitate its handling. At the lower edge of the beveled surface of the nut a micrometric scale $n^2$ is provided which can be read off by aid of a marking $g^{11}$ provided on the circumference of the ring $g^6$.

It will be seen that after the scriber $p$ has been first roughly adjusted in position within the hollow of the micrometric spindle $m$, as heretofore stated, the fine adjustment can be accomplished by the turning of the nut $n$ into one or the other direction.

The device is used as follows:

Let us assume the central line of a spindle S is to be ascertained. The spindle may be secured in position on suitable base blocks 1 by clamps 2 or the like. Then a square guide block $q$ having perfectly even side surfaces is placed against the side surfaces of base blocks 1 and the base $a$ of the tool is placed with its front side surface against the rear side surface of the guide block $q$. The spindle $f$ is adjusted to the proper angle so as to bring the end of the scriber $p$ within a small fraction of an inch above the upper surface of the spindle S. This adjustment is effected by the turning of the arm $d$ in the member $b$. After this adjustment the nut $e$ is tightened so as to fix the position of the spindle $f$.

Now by estimation a more or less rough or free adjustment of the operating end of the scriber toward the central line of the spindle is effected. This is done by slackening the screw $o$ and shifting the scriber within the sleeve $m$ by hand either forwardly or rearwardly as the case may be. On slackening the nut $e$ the scriber is swung down to be in contact with the spindle S whereupon the nut $e$ is again tightened. After tightening the screw $o$, the tool is shifted longitudinally by moving the base $a$ along the guide block $g$, in the course of which the scriber point will draw a line on the spindle which has been previously covered with chalk or other suitable coating. Thereupon the guide block $g$ and tool are placed on the opposite side of the spindle as indicated by dotted lines in Figs. 1 and 2 and the same operation is performed. If it should happen that the lines drawn by the scriber do not coincide but are separate lines as indicated by the dotted and full lines $x$, $y$ on the spindle, then a further adjustment of the scriber is required. The variance between the two lines may be only a thousandth part of an inch and it will be seen that a very fine adjustment of the scriber will be required. This fine adjustment is therefore performed by the micrometric device. On slackening the screw $o$, the sleeve $m$ is fed forwardly or rearwardly as the case may require by the turning of the graduated nut $n$, an estimated amount into one or the other direction from its zero position which registers with the mark $g^{11}$ on the part $g^6$ whereupon the screw $o$ is again tightened. After this new adjustment, the previously described operation with the tool is performed from each side of the spindle, and such operation may be repeated until the two lines $x$, $y$ finally coincide with one another.

When this occurs the central line of the spindle has been located with the greatest accuracy possible.

Since the construction is capable of various modifications without departing from the principle involved in my invention, I do not wish to restrict myself to the details shown and described.

What I claim and desire to secure by Letters Patent is:

1. In a gage, the combination with an adjustable spindle, of a scriber support adjustably supported on said spindle, a sleeve freely borne in said support and formed on its outer circumference with micrometric thread, a nut carried by said support and working on said thread to feed said sleeve in said support, a scriber movably borne in said sleeve, and means in said support to fix said scriber in position within said sleeve after its micrometric adjustment by said nut is effected.

2. In a gage, the combination with an adjustable spindle, of a scriber support adjustably supported on said spindle, a sleeve freely borne in said support and formed on its outer circumference with micrometric thread, a graduated nut carried by said support and working on said thread to feed said sleeve in said support, a scriber movably borne in said sleeve, and means in said support to fix said scriber in position within said sleeve after its micrometric adjustment by said nut is effected.

3. A gage comprising a base, a spindle adjustably mounted on said base, a scriber support adjustably supported on said spindle, a sleeve freely borne in said support and formed on its outer circumference with micrometric thread, a nut carried by said support and working on said thread to feed said sleeve in said support, a scriber movably borne in said sleeve, and means in said support to fix said scriber in position within said sleeve after its micrometric adjustment by said nut is effected.

4. In a tool maker's surface gage, the combination with an adjustable spindle, of a scriber support having a wedge-shaped member, a clamp member adjustably supported on said spindle and having a groove to engage said wedge-shaped member, and means for simultaneously clamping said clamp member to the spindle and fixing said support to said clamp member.

In testimony whereof I affix my signature in presence of two witnesses.

CHARLES HERTLE.

Witnesses:
 FRED. J. GRIESMER,
 ELSIE SCHMID.

Copies of this patent may be obtained for five cents each, by addressing the "Commissioner of Patents, Washington, D. C."